US006986481B2

(12) United States Patent
Fanucci et al.

(10) Patent No.: US 6,986,481 B2
(45) Date of Patent: Jan. 17, 2006

(54) EXTENDABLE JOINED WING SYSTEM FOR A FLUID-BORN BODY

(75) Inventors: Jerome P. Fanucci, Lexington, MA (US); Michael J. King, Topsfield, MA (US); David P. Maass, Guilford, CT (US); Pavel Bystricky, Cambridge, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 0 days.

(21) Appl. No.: 10/698,580

(22) Filed: Oct. 31, 2003

(65) Prior Publication Data

US 2004/0217230 A1 Nov. 4, 2004

Related U.S. Application Data

(60) Provisional application No. 60/422,771, filed on Oct. 31, 2002, provisional application No. 60/425,138, filed on Nov. 8, 2002.

(51) Int. Cl.
*F42B 10/12* (2006.01)
(52) U.S. Cl. .................... 244/3.26; 244/3.27; 244/46
(58) Field of Classification Search ............... 244/46, 244/49, 3.26, 3.27
See application file for complete search history.

(56) References Cited

U.S. PATENT DOCUMENTS

| | | | | |
|---|---|---|---|---|
| 3,990,656 A | * | 11/1976 | Minnich | 244/3.27 |
| 4,106,727 A | * | 8/1978 | Ortell | 244/49 |
| 4,364,531 A | * | 12/1982 | Knoski | 244/3.27 |
| 5,039,030 A | * | 8/1991 | Kraus | 244/3.28 |
| 5,615,846 A | * | 4/1997 | Shmoldas et al. | 244/3.28 |
| 5,899,410 A | * | 5/1999 | Garrett | 244/45 R |
| 5,901,928 A | * | 5/1999 | Raskob, Jr. | 244/204 |
| 5,934,967 A | * | 8/1999 | Brown et al. | 446/62 |
| 6,078,674 A | * | 6/2000 | Cattafesta et al. | 381/71.7 |
| 6,231,013 B1 | * | 5/2001 | Jaenker | 244/215 |

OTHER PUBLICATIONS http://www.wtec.org/loyola/polymers/c1_s6.htm.*

* cited by examiner

*Primary Examiner*—Kurt Rowan
*Assistant Examiner*—Timothy D. Collins
(74) *Attorney, Agent, or Firm*—Weingarten, Schurgin, Gagnebin & Lebovici LLP

(57) ABSTRACT

An extendable wing system for a fluid-born body has a forward wing and an aft wing pivotably coupled together at a location outward of their wing roots. A linkage mechanism mounted on the body provides both pivoting of the wing roots about a pivot point and translation of the wing roots and their pivot points to extend the joined wings from a stowed position to a deployed position. Translation of the forward wing root pivot point allows the stowed wing system to occupy additional space toward the nose of the body, thereby allowing use of wings having a longer wingspan and greater aspect ratio. The linkage mechanism can also be used to incorporate flight control, such as roll and pitch control, directly into the wing system. In another embodiment, the wings can incorporate actuator elements on or within the wings to effect flight control by deformation of the wing structure.

41 Claims, 10 Drawing Sheets

EXTENDABLE JOINED WING SYSTEM FOR A FLUID-BORN BODY

CROSS REFERENCE TO RELATED APPLICATIONS

This application claims the benefit under 35 U.S.C. § 119(e) of U.S. Provisional Application No. 60/422,771, filed on Oct. 31, 2002, and U.S. Provisional Application No. 60/425,138, filed on Nov. 8, 2002, the disclosures of which are incorporated by reference herein.

STATEMENT REGARDING FEDERALLY SPONSORED RESEARCH OR DEVELOPMENT

The invention was made with Government support under SBIR Grant Contract # F08630-02-C-0047. The Government has certain rights in the invention.

BACKGROUND OF THE INVENTION

Many types of air-born bodies, both powered and unpowered, include a glide capability to increase the body's range. This is particularly the case with munitions, such as bombs, rockets, or missiles, for which a greater standoff range is desirable. Greater standoff range enhances pilot and aircraft survivability. A longer range also provides additional opportunities for maneuvering of the air-born body during flight.

Increasing the range of an air-born body can be achieved through extendable wings that are deployed during flight. Before flight, these wings are stowed either within the body itself, or within a small volume that fits within the body's storage footprint. In one type of deployable range extension wings, the wings are hinged at the root to the body's fuselage. In the stowed position, the wings lie generally parallel to and against the fuselage. During deployment, the wings pivot outwardly to provide a swept wing configuration. Efficient packaging during storage is particularly important to minimize drag and range loss in the case of externally carried weapons. For internally stored weapons, payloads should be maximized with minimum volume. However, designing a deployable wing that offers high efficiency, small packaging volume, and low cost is challenging.

A joined or "diamond" wing configuration offers benefits for deployable range extension wings. In this configuration, two extending wings are attached together via a pivot at a common wing tip. This arrangement offers a compact packaging as the wings are folded closely together during storage. After deployment, the triangular wing configuration provides greater strength and stiffness than does a single wing of comparable span or area. As one wing bends or twists, the attached wing also must bend or twist, and the net effect of the bending-twisting coupling is improved structural performance. Improved structural margins allow a higher degree of maneuverability without overstressing the wings.

U.S. Pat. No. 5,615,846 discloses a joined wing range extension kit called a "diamond back." This extended wing has been shown to successfully increase the range of an air-born body. There are disadvantages with the diamond back type of wing also. The diamond back is a complex mechanism and expensive to manufacture. The external packaging volume needed to house the mechanism is considerable. To maximize strength and stiffness in a narrow profile, the wings are CNC machined from stainless steel, which has three times the density of aluminum and has a high radar signature. Mechanically actuated ailerons have additionally been used to provide roll control.

SUMMARY OF THE INVENTION

The present invention relates to an extendable joined wing system for a fluid-born body. The system has two pairs of joined wings, each pair having a forward wing and an aft wing pivotably coupled together at a point located outwardly from their roots. To extend the joined wings from a stowed position to a deployed position, a linkage mechanism mounted on the body provides both pivoting of the wing roots about a pivot point on the body and linear translation of the wing roots and their pivot points. Linear translation of the forward wing root pivot point allows the stowed wing system to occupy additional space toward the nose of the body, thereby allowing use of wings having a longer wingspan and greater aspect ratio. This results in increased aerodynamic efficiency (greater lift/drag ratio) and greater standoff range.

The linkage mechanism can also be used to incorporate flight control, such as roll and/or pitch control, directly into the wing system, reducing or eliminating separate actuators and flight surfaces, with attendant cost and weight savings and enhanced reliability. By extending or retracting the wings partially, a desired rolling and/or pitching motion can be achieved. The left and right wing pairs can be moved symmetrically or asymmetrically, depending on the desired motion. In another embodiment, actuator elements can be incorporated on or within the wings to effect flight control by deformation of the wing structure.

The forward and aft wings can be formed of any suitable material, such as a metal or a composite material. The wings can be formed in any suitable process, such as extrusion, molding, or pultrusion. Pultrusion is a suitable manufacturing process to form composite wings of a constant cross-section at low cost, with high strength and high aspect ratio.

DESCRIPTION OF THE DRAWINGS

The invention will be more fully understood from the following detailed description taken in conjunction with the accompanying drawings in which.

DETAILED DESCRIPTION OF THE INVENTION

Figure 2B:
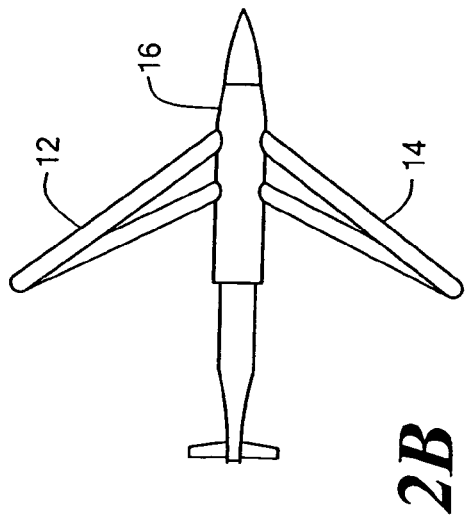
FIG. 2B is a plan view of the air-born body and extendable joined wing system of FIG. 2A in an intermediate position during deployment.
Figure 2C:
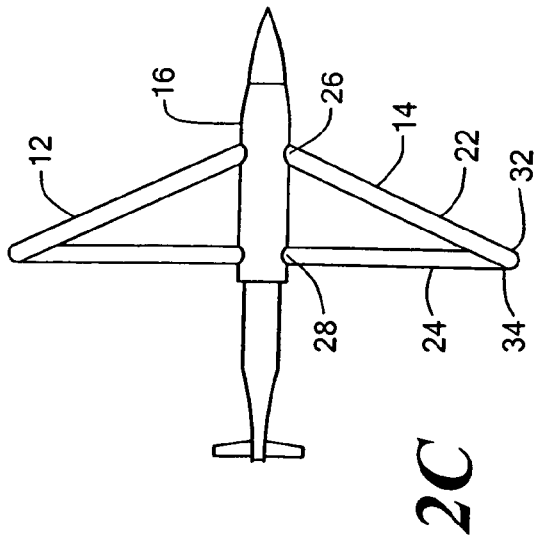
FIG. 2C is a plan view of the air-born body and extendable joined wing system of FIG. 2A in the fully deployed position.
Figure 1:
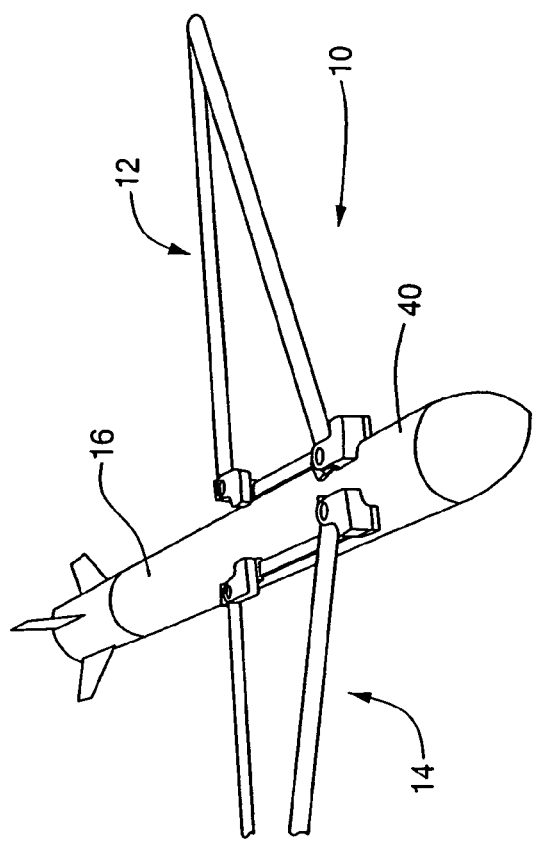
FIG. 1 is an isometric view of an air-born body incorporating an extendable joined wing system according to the present invention.
Figure 2A:
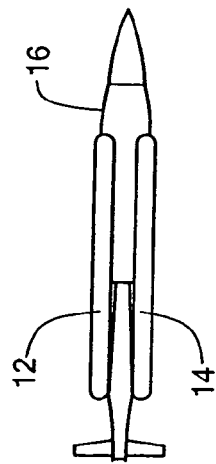
FIG. 2A is a plan view of an air-born body incorporating an extendable joined wing system according to the present invention, shown in the stowed position.

An extendable joined wing system 10 of the present invention is illustrated in FIGS. 1 and 2A–C. The wing system includes two pairs 12, 14 of joined wings, one pair deployable on each side of the fuselage of a fluid-born body 16. Typically, the wing system is used on an air-born body. FIG. 1 and FIG. 2C illustrate the wing system in the fully deployed position. FIG. 2A illustrates the wing system in the fully stowed position. FIG. 2B illustrates the wing system in an intermediate position during deployment. Only one joined wing pair will be described below, as the description of one pair will suffice for the other pair.

A joined-wing pair has a forward wing 22 and an aft wing 24, each of which has an airfoil profile and extends from a wing root 26, 28 to a wing tip 32, 34. The particular airfoil profile for each of the forward and aft wings is selected based on the particular design, as determined by those of skill in the art. The forward wing and the aft wing are joined together with a pivoting joint at a location outward from their wing roots. For example, the wings can be joined at their wing tips, as illustrated, the wing tip of the aft wing can be joined to the forward wing at a middle location, or another configuration can be used. The wing roots of both the forward wing and the aft wing are mounted to the fuselage via a linkage mechanism 40 that provides both rotation of the roots 26, 28 about a pivot point 42, 44 and translation of the roots and their pivot points along a portion of the fuselage parallel to the longitudinal axis of the fuselage, indicated by the arrow 46. (See FIG. 3.) Translation of the forward wing root allows the wing to have a longer wing span and a greater aspect ratio, discussed further below. The translation is generally along a linear path, although a non-linear path can be used if suitable for a particular application.

Figure 3:
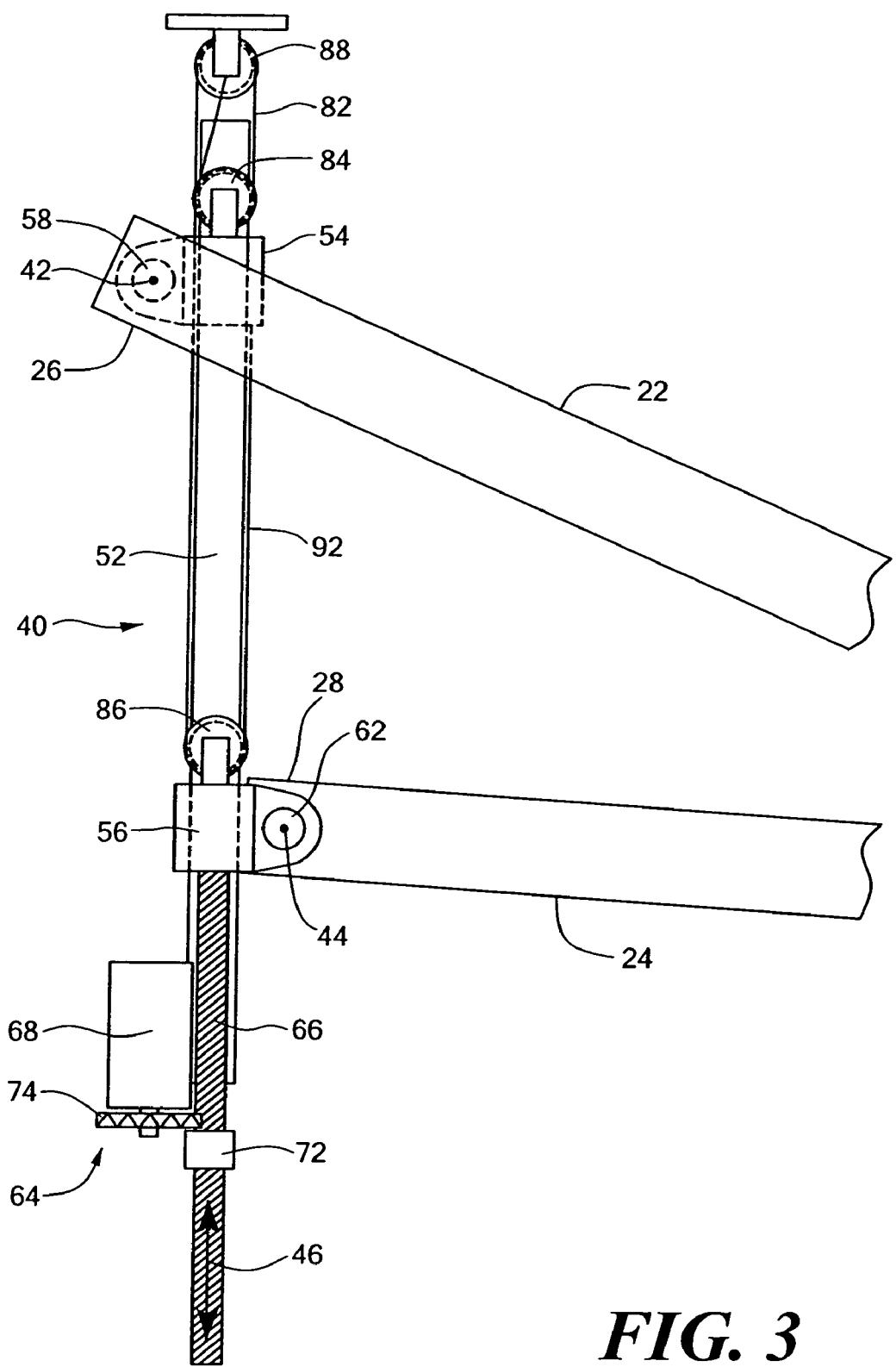
FIG. 3 is a partial plan view of a linkage mechanism for the joined wing system of the present invention.
Figure 4:
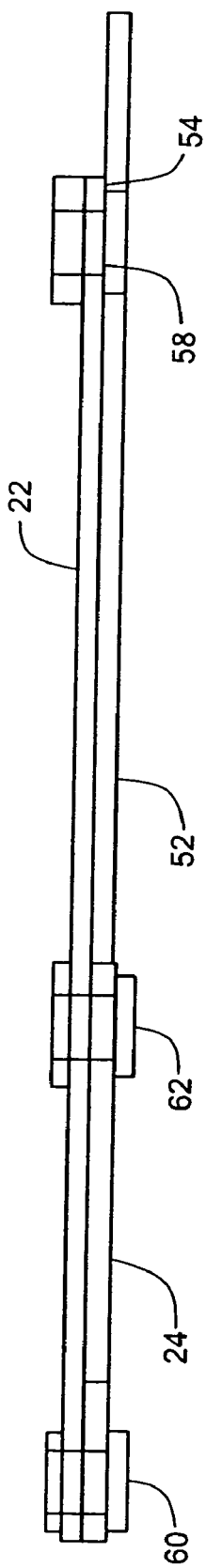
FIG. 4 is a side view of the linkage mechanism of FIG. 3.
Figure 5:
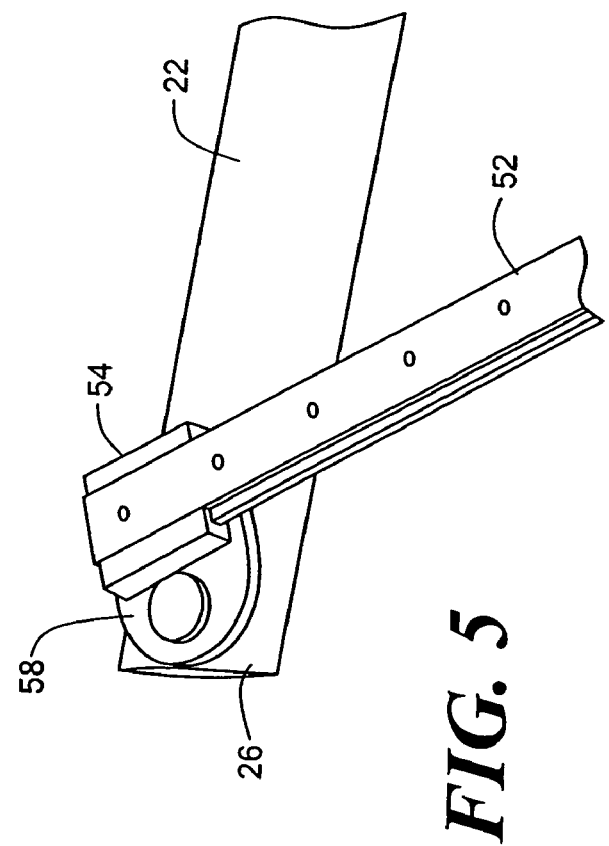
FIG. 5 is a partial bottom view of the forward wing root pivot mechanism of FIG. 3.

Various translation mechanisms, such as acme screws, ball screws, roller screws, differential roller screws, rolling ring screws, linear bearings, linear slides, or linear drives, can be incorporated into the linkage mechanism. One example of a suitable linkage mechanism 40 is illustrated in FIGS. 3 through 5.

A rail 52 is mounted to the fuselage extending longitudinally along an upper surface of the fuselage and offset to the side from the centerline of the fuselage. A forward block 54 and an aft block 56 are mounted for travel along the rail. The forward wing root 26 and the aft wing root 28 are pivotably attached via any suitable pivot mechanism 58, 62 to the forward block and the aft block respectively so that, as the blocks travel along the rail, the wings pivot with respect to the blocks. The forward wing and the aft wing are pivotably attached via any suitable pivot mechanism, such as a pivot pin 60 at the wing tips, as illustrated.

A suitable actuating mechanism 64 is provided to actuate translation of the blocks. In the embodiment illustrated, a ball spline 66 is attached to the aft block 56. Translation of the ball spline is effected by a stepper motor 68 operative to rotate a ball spline nut 72 through which the ball spline is disposed. Speed reduction gears 74 for torque multiplication may be provided if desired. The aft block translates with the ball spline. The forward block 54 is coupled to the aft block 56 via a suitable coupling mechanism, such as a pulley system 82. In the embodiment illustrated, a forward pulley 84 is attached to the forward block, an aft pulley 86 is attached to the aft block, and a fixed pulley 88 is fixed with respect to the fuselage. A cable 92, such as an aircraft grade control cable, is attached to the forward block and to the fuselage at the location of the fixed pulley. From the fuselage attachment point, the cable passes around the forward pulley, the fixed pulley, and the aft pulley to the attachment point at the aft block. In this manner, translation of the forward block follows translation of the aft block. It will be appreciated that the pulley system can be arranged to provide any desired ratio of translation of the forward block to the aft block. Thus, in operation to extend and deploy the joined wing, the forward wing root translates or slides aft, just as the aft wing root slides aft. Because the forward and aft wings are joined at a pivot point, the wing roots are caused to pivot as well by the translation. It will also be appreciated that other coupling mechanisms can be provided.

Figure 6:
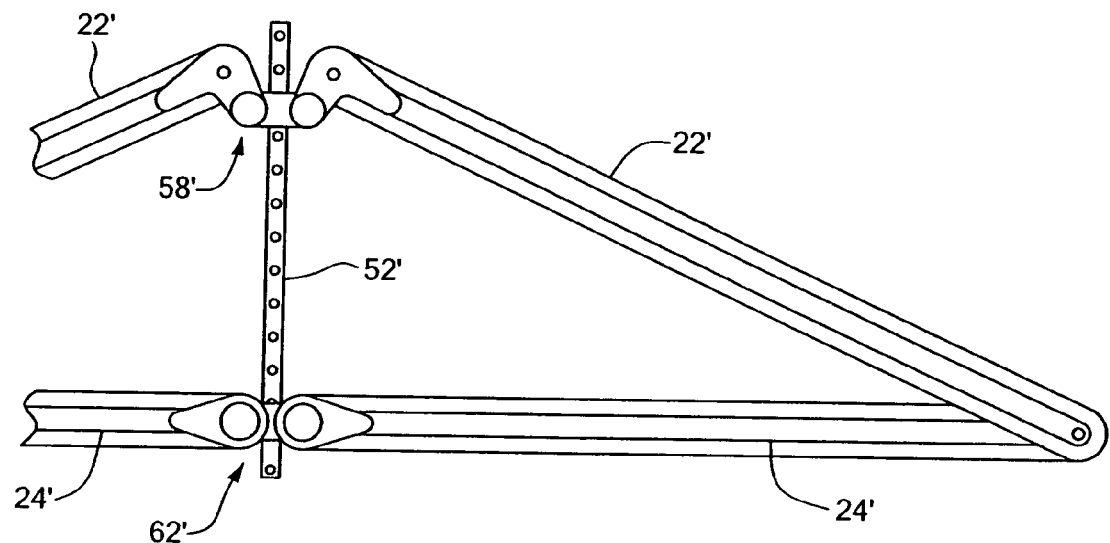
FIG. 6 is a partial top plan view of an alternative linkage mechanism for the joined wing system of the present invention.
Figure 7:
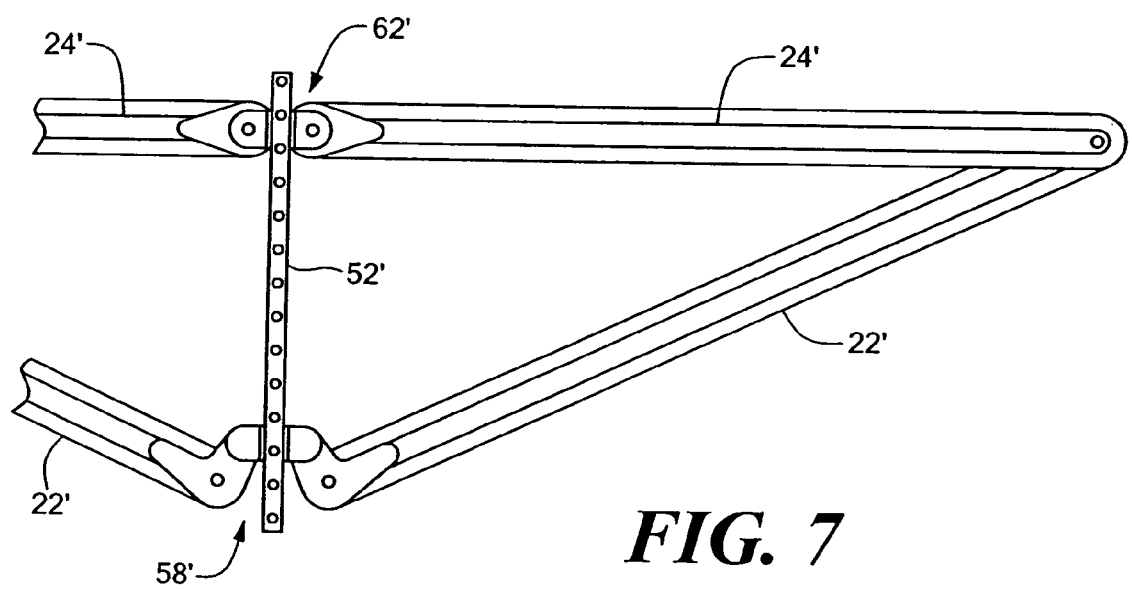
FIG. 7 is a partial bottom plan view of the alternative linkage mechanism of FIG. 6.

It will be appreciated that other actuation systems can be provided, such as a separate actuator for the forward block and the aft block, or an actuator to drive the forward block with the aft block following. Similarly, other linkage mechanisms can be provided. For example, as illustrated in FIGS. 6 and 7, the forward wings 22' of each joined-wing pair can be mounted for linear translation on a single rail 52' and coupled via a pivoting mechanism 58' for simultaneous actuation with an associated actuator. The aft wings 24' of each joined-wing pair can similarly be mounted for linear translation on the rail 52' and coupled via a pivoting mechanism 62' for simultaneous actuation with an associated actuator. Other configurations are possible, as will be apparent to those of skill in the art.

The aft wing pivot point 44 is preferably laterally offset toward the side of the fuselage with respect to the forward wing pivot point 42, as shown in FIG. 3. This offset reduces the actuation loads required to deploy the wing, which in turn reduces the weight and cost of the actuator and energy storage systems. The duration of wing deployment can take several seconds. Great deployment speed is frequently not necessary. The wing system can be retracted back to the stowed position if desired.

To provide pitch stability during flight, the center of pressure, $C_p$, of the deployed wing system must be located aft of the center of gravity, CG, of the body. This generally means locating the forward wing root between 25% and 50% of the body length aft of the nose when the wing pair is deployed. Use of a fixed forward wing root pivot point, as in prior art wing deployment mechanisms, means that the stowed wing pair cannot use the portion ahead of the forward wing root pivot point for storage. Because the complete length of the fuselage is not used during storage, the wingspan is limited. This is particularly the case with weapons systems, because the stowed wings cannot extend beyond the weapon's footprint. The present invention is advantageous in that a greater part of the forward space of the air-born body can be used for wing storage, which in turn allows for a longer wingspan.

Wingspan and aspect ratio have a strong influence on glide range. Maximum glide angle is proportional to the lift (L) to drag (D) ratio (L/D) of the body. For a given air-born body with a defined profile drag coefficient, maximum L/D is achieved by minimizing induced drag (i.e. the drag due to wing lift). The maximum L/D can be shown to be:

$$L/D_{max} = \frac{(\pi \ e \ AR)^{1/2}}{4(C_d^f + C_d^o)}$$

where:
e=Oswald efficiency factor;
AR=wing aspect ratio= $b^2/S$;
b=wing span;
S=wing area;
$C_d^f$=fuselage drag coefficient; and
$C_d^o$=wing profile drag coefficient.

For a given vehicle fuselage, the fuselage drag coefficient, $C_d^f$, is defined. The Oswald wing efficiency factor, e, and wing profile drag coefficient, $C_d^o$, do not vary greatly for most high performance wing designs. This means that the critical wing parameter is:

$$AR^{1/2} = (b^2/S)^{1/2} (b^2/c_{mac}b)^{1/2} = (b/c_{mac})^{1/2}$$

where: $c_{mac}$=mean aerodynamic wing chord.

Thus, glide range is maximized with the longest wingspan (high b) and shortest or narrowest chord (small c). All other considerations aside, a wing with a high aspect ratio, i.e., a long, narrow wing, provides the greatest glide range.

The wing's aspect ratio is limited by other practical requirements. The longer the wing, the higher the bending moment that is generated and must be carried at the wing root. In addition, the longer the wing span and shorter the chord, the more flexible the wing becomes in torsion and bending. Excessive flexibility can lead to flutter or divergence and these effects must be considered in the wing design. Furthermore, a higher aspect ratio wing requires a somewhat larger tail surface for adequate stability and control. The small additional drag of the larger surface slightly offsets the range gain from the wing. However, within these constraints, higher aspect ratio wings yield improved glide range.

Figure 8:
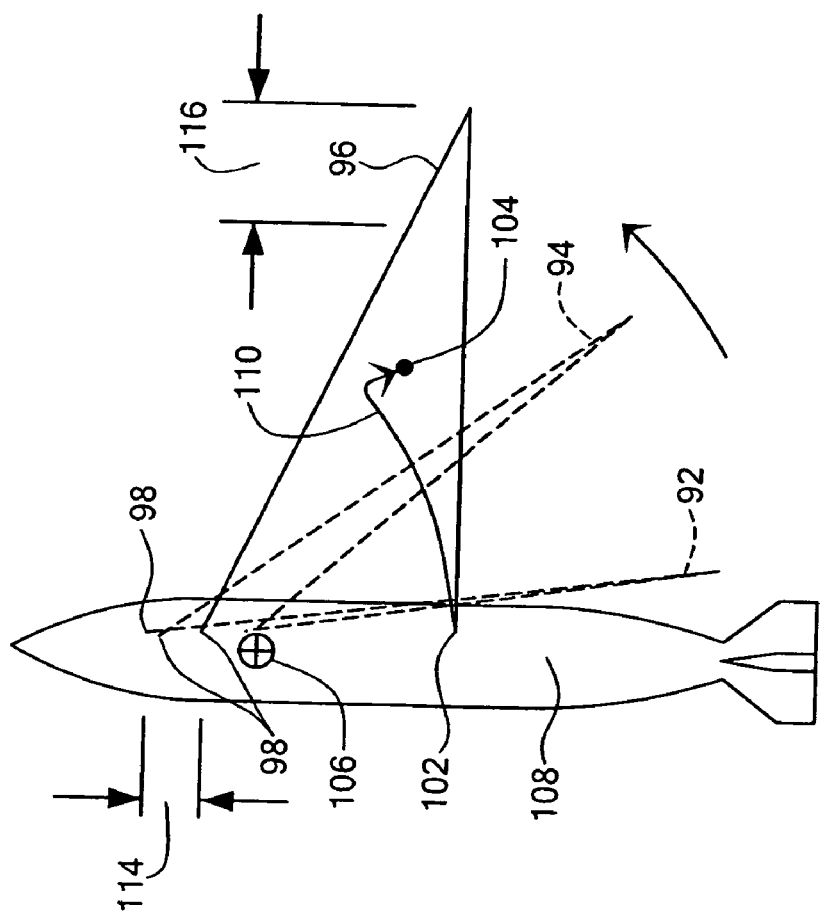
FIG. 8 is a schematic view illustrating positions during deployment of a joined wing pair relative to the center of gravity of the air-born body and showing movement of the wing pair's center of pressure.

The extendable joined wing system of the present invention allows the folded or stowed wings to fit against a longer portion of the fuselage of the air-born body, because the stowed wing can occupy more space toward the nose of the fuselage. This permits use of a longer, higher aspect ratio wing, providing improved range. Referring to FIG. 8, the deployment of the joined wing pair is illustrated. The wing pair is shown in a first position 92 just after deployment has begun, an intermediate position 94, and the fully deployed position 96. The forward wing root 98 slides aft a determined increment for every increment of aft travel of the rear wing root 102. The center of pressure, $C_p$, 104 is located aft of the center of gravity, CG, 106 of the vehicle body 108 for stability when the wings are fully deployed. The path taken by $C_p$ during deployment is shown by the arrow 110.

Figure 9:
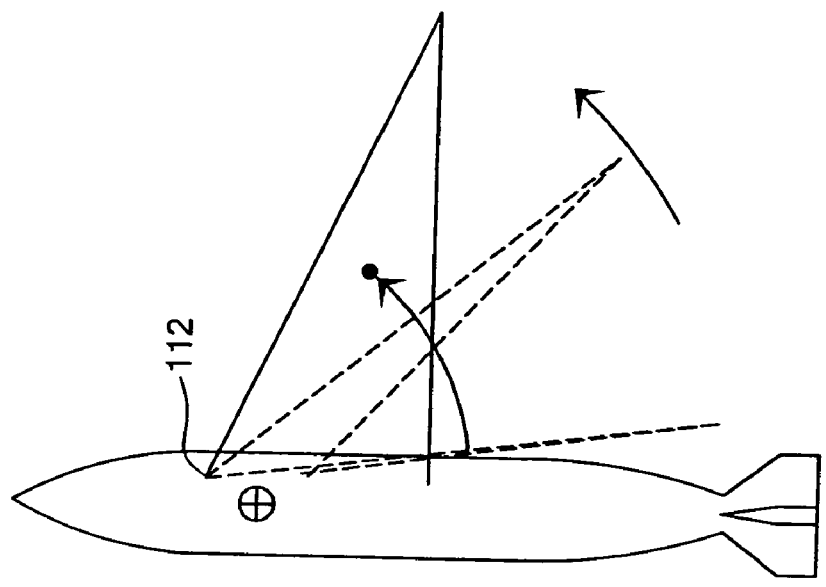
FIG. 9 is a schematic view illustrating positions during deployment of a prior art joined wing pair.

For comparison, FIG. 9, illustrates the deployment of a conventional joined wing pair, in which the forward wing root pivot point 112 is fixed. It can be seen that the forward root of the vehicle is not used for wing stowage. In contrast, with the joined wing pair of the present invention, the forward wing root is located further towards the nose of the body in the stowed position, using this available storage space 114. However, in the fully deployed position, the wing $C_p$ is located at the same position with respect to the vehicle CG. This additional storage space permits use of a wing with a longer wingspan 116 and greater aspect ratio.

EXAMPLE

A comparison was made of the projected aerodynamic performance of the extendable wing of the present invention with a more conventional joined wing approach in which the forward wing root pivot point remains fixed relative to the vehicle body, such as the diamond back wing. The following L/D ratios were calculated for the wings only at sea level, Mach 0.5 conditions:

| Item | Max available wing span | L/D @ SL, M-0.5 |
| --- | --- | --- |
| Fixed Forward Wing | 57.25" | 19.4 |
| Invention | 79.00" | 23.3 |
| Improvement | +21.75" | +21% |

For certain air-born bodies, typical wing drag contribution is at least half the total vehicle drag in the best glide condition. Therefore, the use of the extendable wing deployment mechanism of the present invention should result in at least a 10% improvement in vehicle L/D, and a corresponding increase in glide range.

Larger span, higher aspect ratio wings have an associated aerodynamic penalty, however. As wingspan increases, the rolling moment required to initiate a turn and to counter adverse yaw generated in the turn also increases. The greater the rolling moment and adverse yaw, the larger the size of the control fins, associated actuators and power supply must be to control the rolling moment. Larger control fins, actuators and power supply add to the drag and weight penalty. However, small changes in the linkage geometry of the present joined wing system can be used to design substantially different positions of the wing $C_p$ as it deploys, thereby incorporating flight control directly into the wing system and allowing a reduction in the control fins and associated actuators and power supply.

FIGS. 10A–D represent examples of different ratios of travel of the forward wing root to the aft wing root. In these examples, the aft wing is fixed at 90% of the span of the forward wing and the chords of both wings are identical. The ratio R represents the travel of the forward wing with respect to the aft wing. In the first linkage (FIG. 10A), R=1, which means that the forward wing root travels 1 inch aft for every 1 inch of aft travel (i.e. separation) of the aft wing root. The path traveled by $C_p$ of the combined wing planform (the quarter chord point of the mean aerodynamic chord for the entire joined wing planform) during deployment is shown.

Figure 10A:
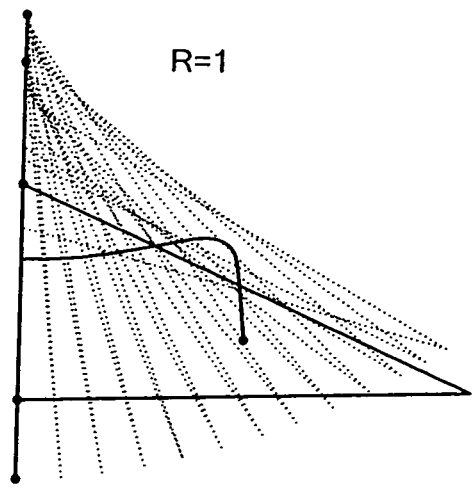
FIGS. 10A–10D are schematic illustrations of the deployment of a joined wing pair illustrating various ratios of travel of the forward wing root relative to the aft wing root.

In FIG. 10A, $C_p$ travels laterally outward and then turns sharply aft during the last portion of wing deployment. The entire joined wing pair translates aft during deployment.

Figure 10B:
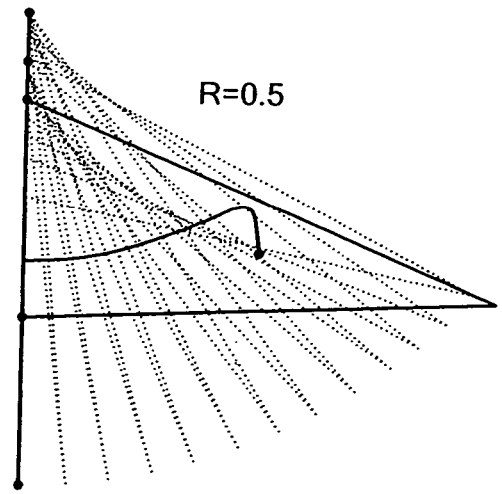
Figure 10C:
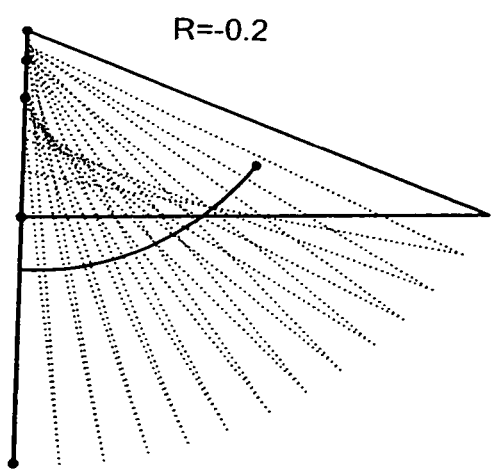
Figure 10D:
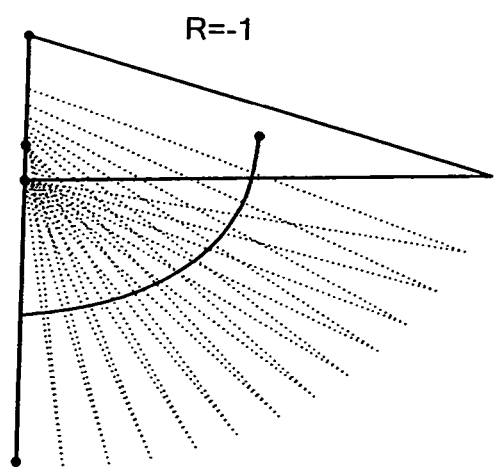

If the R ratio is reduced, as shown in FIG. 10B, $C_p$ moves further forward during deployment and less sharply aft at the fully deployed position. Similarly, for negative R ratios (where the forward wing root moves forward as the aft wing root moves aft), shown in FIGS. 10C and 10D, $C_p$ travel continues to increase its forward travel, as does the entire wing planform. $C_p$ position can be further tailored by using different chord lengths on the front and rear wing. The ability to tailor the movement of the wing $C_p$ as it deploys offers substantial benefits. As long as $C_p$ is aft of the vehicle CG (which is fixed for the air-born body), positive pitch stability is maintained.

Figure 11:
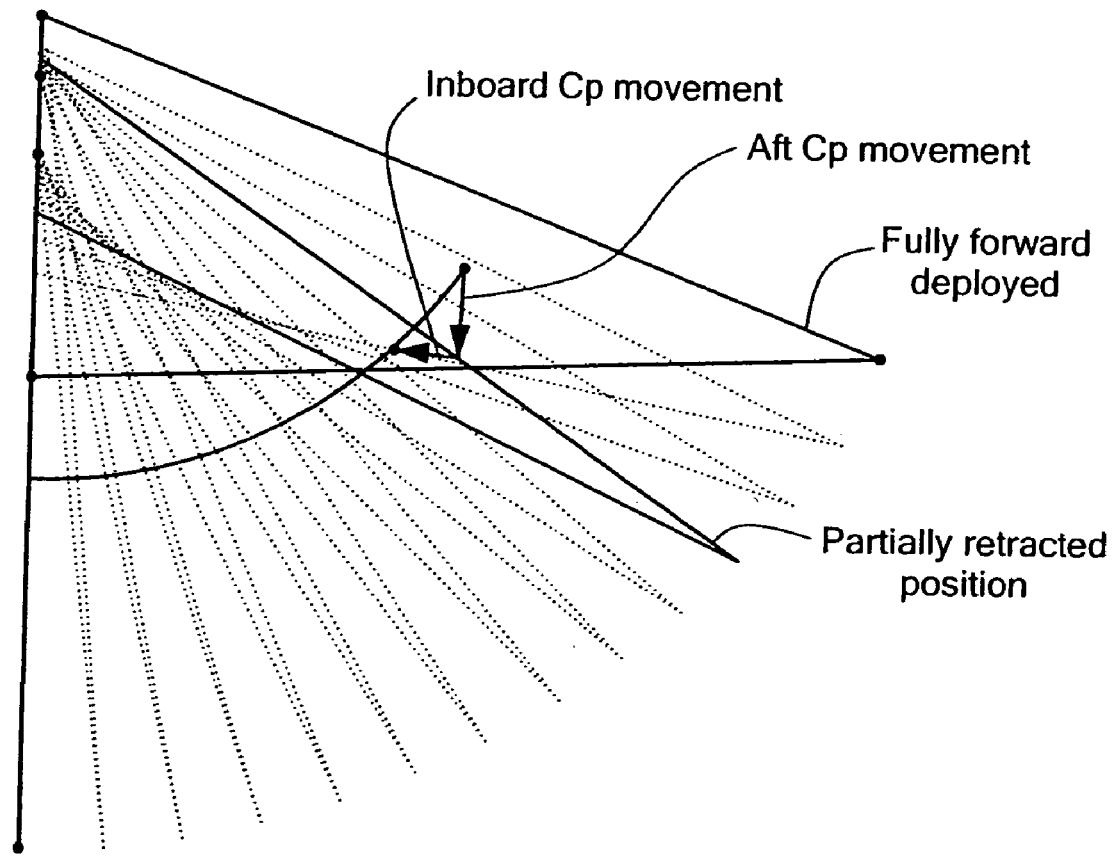
FIG. 11 is a schematic illustration of a joined wing pair showing retraction for flight control purposes.

More particularly, in the configuration shown in FIG. 11, as the wing pair is slightly retracted from its fully deployed condition, $C_p$ moves aft and inboard. If both the left and right wing pairs are partially retracted simultaneously, the aftward movement of $C_p$ results in a nose down pitching moment, causing the vehicle to pitch down and gain speed. This permits vehicle pitch control using the mechanism to deploy the wing system. Therefore, the size of the vehicle control fins can be reduced or eliminated, saving cost, weight, and aerodynamic drag.

If the left and right wing pairs of the vehicle are moved in opposite directions, the lateral shift in $C_p$ position generates a net rolling moment. This permits vehicle roll control also using the mechanism to deploy the wing system. Therefore, the size of the vehicle control fins can be reduced or eliminated, again saving cost, weight, and aerodynamic drag.

During deployment, the force on the aft root pivot point is opposite to the direction of actuator travel. Thus, to deploy the wing pair requires positive work. However, any retraction motion, whether to retract the wing pair or to control the pitch or roll of the vehicle, has the actuator force and actuator motion vector in the same direction. Thus, retraction requires little energy expenditure and can be accomplished quickly. Thus, with the present invention, using the same wing deployment mechanism, both pitch and roll control can be obtained. This results in both a cost and weight reduction. Fewer systems also provide greater reliability.

In another embodiment, the forward wing can be disposed in a more forward position during deployment, placing the center of pressure, $C_p$, ahead of the center of gravity, CG, of the air-born body, rather than in its more conventional, statically stable aft location. This creates a system that operates in a steady state glide with up-loaded tail surfaces instead of a more conventional down-load of a statically-stable configuration, greatly increasing overall system L/D. More complex and active control software is required in this case.

It will also be appreciated that the translatable and rotatable linkage mechanism can be employed with a single extendable wing system, rather than a joined wing system, in which a single extendable wing is mounted on each side of the fuselage. The single wings are stowed against the fuselage during storage, as discussed above, and rotated and translated during deployment, also as discussed above. Any suitable linkage mechanism to effect the translation and rotation can be provided. For example, the left and right wings can be mounted for translation along one slide or along two slides. As with the joined wing configuration, the single wings can take advantage of the additional storage space near the nose of the fuselage by virtue of being able to translate during deployment.

The wings can be formed from any suitable material, such as a composite material or a metal. Suitable metals include aluminum or stainless steel. Any suitable manufacturing process can be used, such as extrusion, molding, or pultrusion.

The forward and aft wings can be expeditiously formed by a pultrusion process, a process for forming a fiber-reinforced, resin matrix composite product. A composite pultrusion with an airfoil cross section creates an ideal high aspect ratio wing. A pultruded wing is low in cost to manufacture and very strong. Strength and stiffness can easily be tailored to provide high bending properties by orienting the fibers in the spanwise direction, which is the direction the part is pulled through the pultrusion die. For better torsion properties, fibers can be fed into the pultrusion machine at a 45° angle, which offers higher shear and twist stiffness and strength. Intermediate combinations can be tailored by tailoring the fiber angles. Suitable materials include graphite or carbon fibers, S or E glass fibers, boron fibers, or aramid fibers and epoxy or vinyl ester resins.

Figure 12:
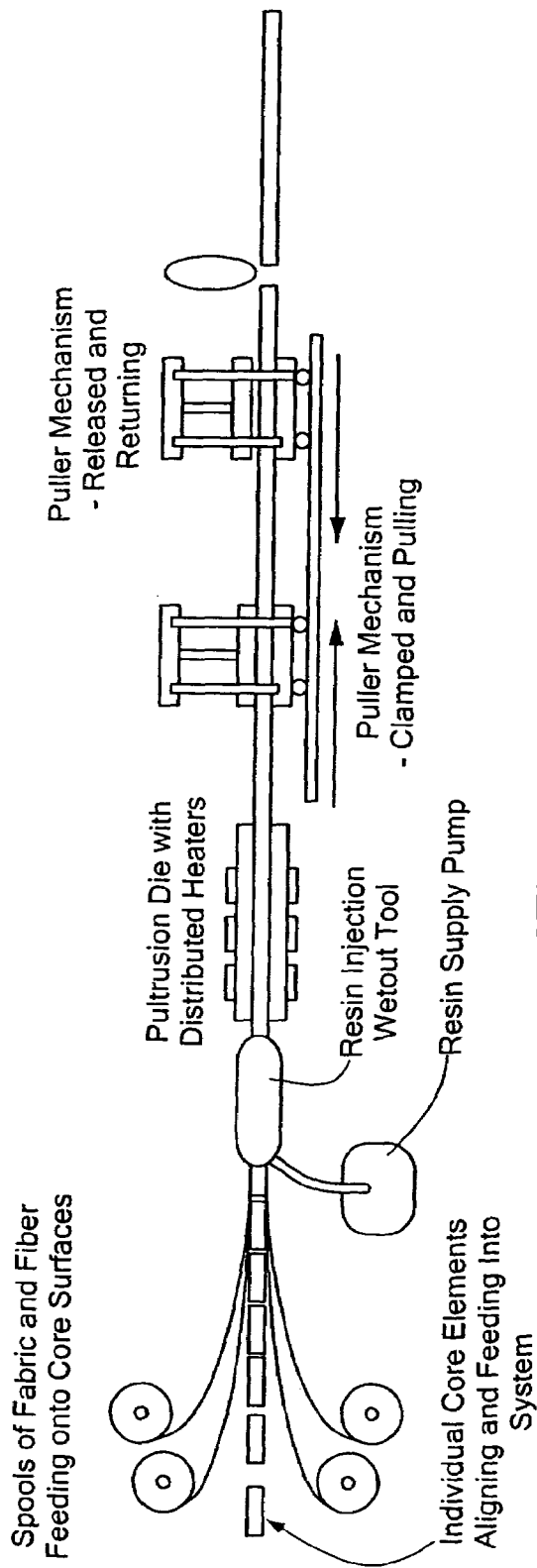
FIG. 12 is a schematic diagram of a pultrusion process for use in manufacturing wings for the joined wing system of the present invention.

Fiber fabric and tows are fed through a wet-out bath of resin to saturate the fibers. The excess resin is squeezed off to meter the amount of resin that the fibers bring into the die. Individual core elements can be added in if desired. The resulting fiber preform is run through two forming cards to define the airfoil geometry, and then fed into the die. The resin is cured and the final product exits the die. A schematic pultrusion process is illustrated in FIG. 12.

Figure 13:
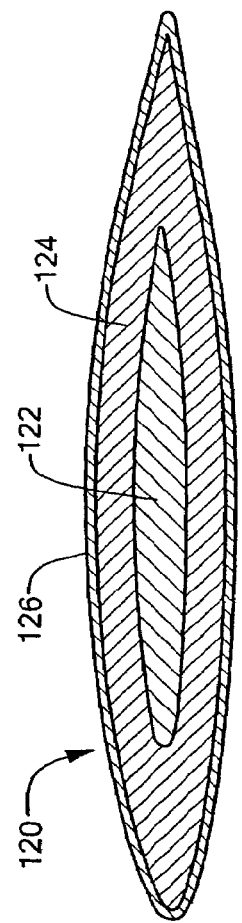
FIG. 13 is a cross-sectional view of a pultruded wing for use in the joined wing system of the present invention.

An exemplary wing cross section is shown in FIG. 13. The wing 120 includes an inner core 122, an intermediate layer 124, and an outer layer 126 to add torsional rigidity, toughness and corrosive resistance. Suitably, the inner core may be formed of fibers, such as glass, or a low density material, such as a foam material. The core provides structural stability and enhances compression during the pultrusion. The wing may also be hollow. The intermediate layers may be fibers such as uni-directional carbon fibers. The outer layer may be a glass reinforcement such as a ±45° continuous strand mat.

The pultruded wing exits the machine with constant chord, that is, the wing is straight or untapered, and with no spanwise twist distribution. The wing can be machined to impart any further finishing, such as to form attachment fittings at the roots, to thin the wing tips or their pivoting attachment locations, or otherwise. A twist distribution of up to 10° may be desired between the wing root and the wing tip. A secondary forming process can be used to provide such as twist.

Figure 14:
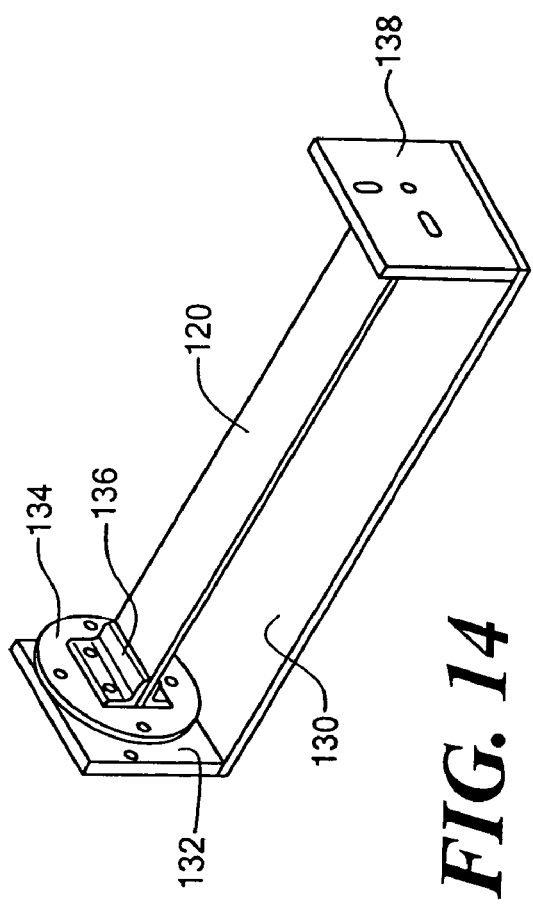
FIG. 14 is a schematic illustration of a twist fixture for imparting a twist to a wing for use in the joined wing system of the present invention.

To impart a twist to the wing 120, the wing 120 is clamped at both ends in a twist fixture 130, such as that illustrated in FIG. 14. One end 132 of the fixture is rotatable, such as with a rotating disk 134 with a clamp 136 thereon. The other end 138 is fixed. In another method, a constant load is applied by placing weight along a desired portion of the wing span. The wing is brought to a temperature near or above the glass transition temperature $T_g$ of the resin to soften the composite slightly without damaging the resin system. The wing is held in a twisted configuration at the elevated temperature for a suitable length of time and then returned to room temperature to fix the twist in place.

Figure 15:
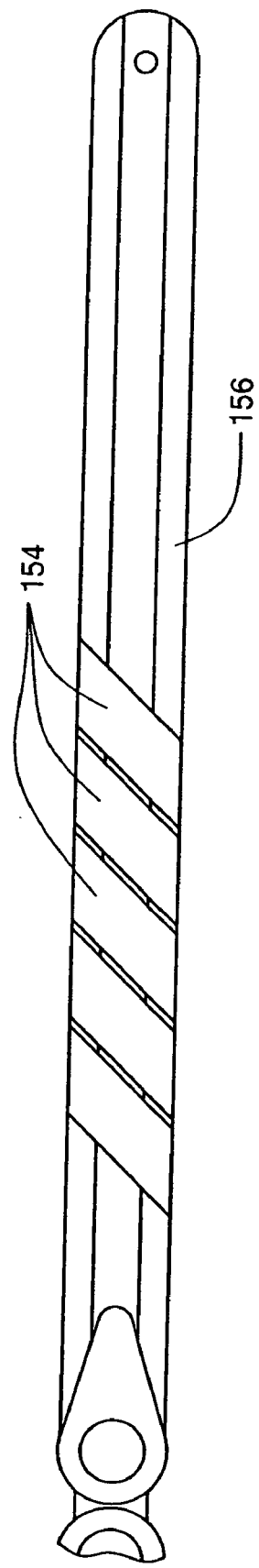
FIG. 15 is a schematic illustration of a wing incorporating piezoelectric actuator elements for deformation of the wing structure distributed along a portion of the leading edge of the wing.

In a further embodiment, flight control can be incorporated directly into the wings, either with or without provision of the linearly translating forward wing root. Actuators 154 and sensors can be embedded directly in or applied onto a wing 156 to actively deform the wing structure in response to commands or other stimuli. See FIG. 15. For example, piezoelectric fibers of PZT (lead zirconate titanate or Pb(Zr, Ti)O3) and associated wiring can be integrally molded as patches into the wing during a pultrusion or other process. When a controlled current is applied, the PZT material strains and causes a structural deflection in the wing. Other potential actuator materials that can be embedded in the wing during manufacture include shape-memory alloys (SMA), ferroelectric (piezoelectric/electrostrictive) materials, and ferromagnetic (magnetostrictive) materials.

Figure 16:
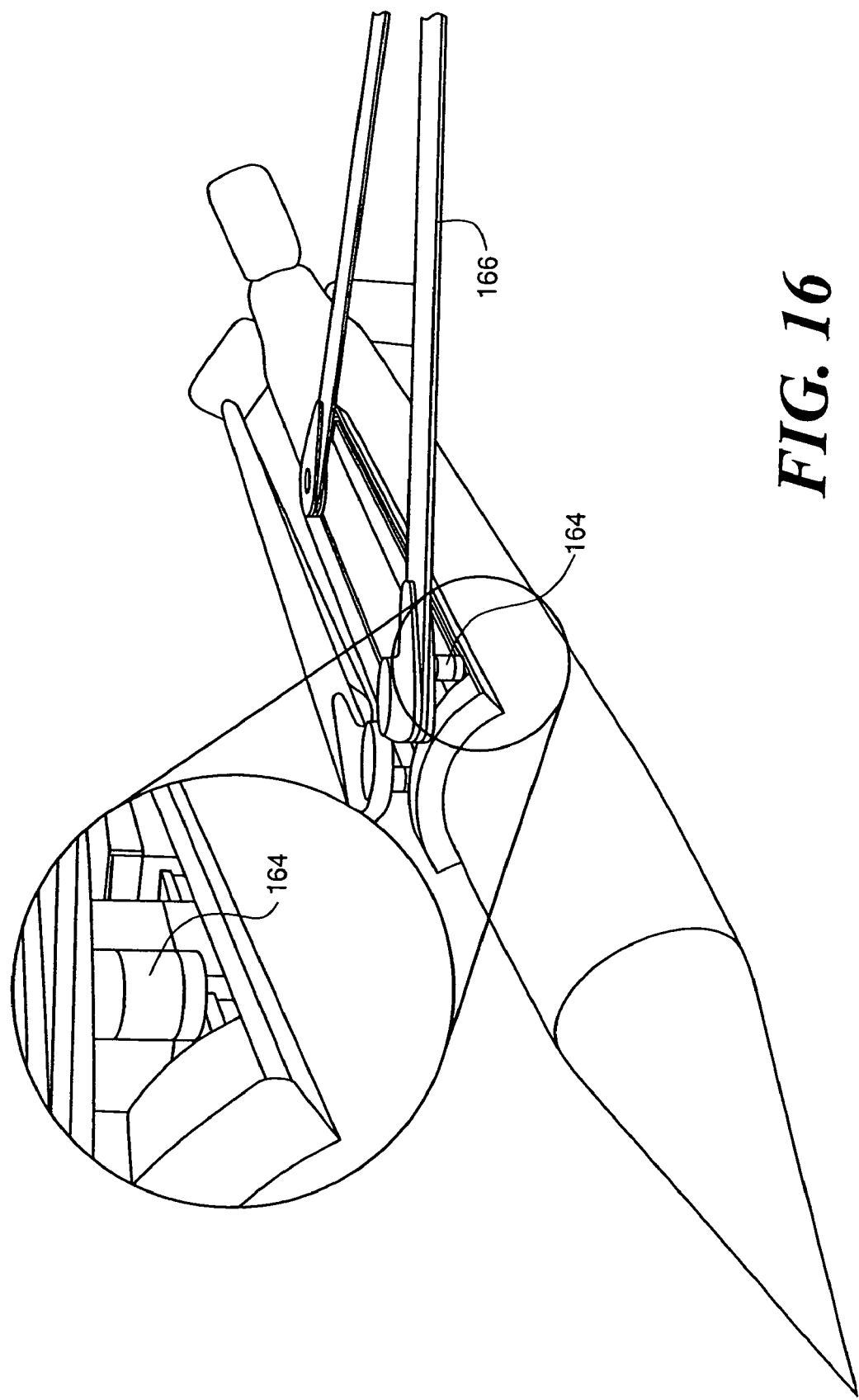
FIG. 16. is a schematic illustration of a wing incorporating a piezoelectric actuator element beneath the trailing edge at the wing root.

The actuators can be distributed along the length or a portion of the length of the wing or located discretely. FIG. 16 illustrates an embodiment incorporating a piezoelectric actuator 164 located discretely beneath the trailing edge of the forward wing 166 at the wing root. In this embodiment, the cylindrically-shaped piezoelectric actuator is operative to extend upon application of a current, thereby providing a deformation at the trailing edge of the wing root that causes the entire wing to deform more as a rigid body.

The long span and high aspect ratio of the pultruded wing allows the wing torsional stiffness to be tailored to permit actuator elements to cause an asymmetric twist deformation, creating a rolling moment. For example, the wing can be fabricated from mostly 0° tape with fiberglass cross-plies providing lateral stability. No off-axis structural composite plies are used. This allows transfer of most of the torsional shear loads to piezoelectric or other actuator elements located on the wing's pressure face. As a result, the actuator elements provide most of the torsional stiffness and accordingly are capable of generating the largest deflections. Wing twist actuator elements should be placed as far inboard as possible. This allows for the most weight and cost savings while generating section pitch deflections, rather than just twist deflections, outboard of the active wing section. A counterbalance may be formed on the leading edge, such as of tungsten, to shift the center of gravity forward to the aerodynamic center of the section to eliminate the possibility of section flutter.

For roll control, several different actuation schemes for active wing manipulation to generate the required control forces and moments can be used. These actuation schemes include camber manipulation, twist manipulation, finite control surface deflections, trailing-edge deformations, and sectional pitch control, as can be determined by those of skill in the art.

Longitudinal or pitch control can also be provided. Because the system is configured as a joined, tandem wing, the aft wing flies in the wake of the forward wing. Because lift changes on the forward wing induce changes in the downwash field over the aft wing, there is a pitch control authority multiplication effect akin to that experienced by canard-controlled missiles. A major difference is that the extremely high aspect ratios of both wing sets lead to high $C_{1\alpha}$ values, making the wings much more sensitive to downwash angle changes. As a result, small deflections at the forward-most portion of the forward wing along an inboard section of the span influence the flow field over the aft wing, thereby generating sizable pitching moments from comparatively modest control deflections. The forward wing can have embedded actuators that provide wing twisting capability. A small nose up twist is commanded on the forward wing. This increases the forward wing angle of attack, which results in increased lift on the forward wing. The increased lift also results in a larger downwash velocity on the forward wing, which acts to decrease the effective angle of attack on the aft wing. The combination of increased lift on the forward wing and decreased lift on the aft wing creates a couple that results in a pitch up moment for the vehicle. Aerodynamic analysis suggests that using the wing deployment mechanism for pitch control can provide pitch authority of −3 to +5 degrees, which is sufficient to allow the pitch control surfaces, actuators, and power supply to be downsized accordingly, reducing weight and drag.

The invention is not to be limited by what has been particularly shown and described, except as indicated by the appended claims.

What is claimed is:

1. An extendable wing system for a fluid-born body, comprising:
   a forward wing extending from a forward wing root to a forward wing tip, the forward wing having an airfoil profile in cross-section;
   an aft wing extending from an aft wing root to an aft wing tip, the aft wing having an airfoil profile in cross-section;
   the forward wing and the aft wing pivotably coupled together at a location outward of the forward wing root end the aft wing root; and
   a linkage mechanism translationally and rotationally coupled to the forward wing root and the aft wing root and configured to effect extension of the forward wing and the aft wing from a stowed position to a deployed position by translation of the forward wing root and the aft wing root in a same direction along a path, the forward wing root end the aft wing root located closer to a nose of the fluid-born body in the stowed position than in the deployed position.

2. The extendable wing system of claim 1, further comprising an actuating mechanism operatively coupled to the linkage mechanism to drive translation of at least one wing root, and rotation of the wing roots follows translation of the wing roots.

3. The extendable wing system of claim 2, wherein the actuating mechanism is operatively coupled to the linkage mechanism to drive the aft wing root.

4. The extendable wing system of claim 1, wherein the linkage mechanism is disposed to provide a determined ratio of translation of one wing root relative to translation of the other wing root.

5. The extendable wing system of claim 1, wherein the linkage mechanism further comprises a linear rail, the forward wing root and the aft wing root each mounted to a block disposed for travel along the rail.

6. The extendable wing system of claim 5, wherein the linkage mechanism further comprises a pivoting mechanism mounted on each block, the forward wing root and the aft wing root mounted via the pivoting mechanism to the block.

7. The extendable wing system of claim 5, wherein a pivot point of the aft wing root is laterally displaced with respect to the rail from a pivot point of the forward wing root.

8. The extendable wing system off claim 5, further comprising an actuating mechanism operative to actuate translation off the blocks.

9. The extendable wing system of claim 5, further comprising an actuating mechanism operative to actuate translation of one of the blocks, and the other of the blocks is coupled to the one of the blocks for translation therewith.

10. The extendable wing system of claim 5 wherein the linkage mechanism further comprises a pulley system coupling the forward wing root and the aft wing root.

11. The extendable wing system of claim 1, further comprising an actuator element on or within at least one of the forward wing and the aft wing, the actuator element operative to deform the associated wing in response to a control signal.

12. The extendable wing system of claim 11, wherein the actuator element comprises a piezoelectric element.

13. The extendable wing system of claim 11, wherein the actuator element comprises a shape-memory alloy, a ferroelectric material, or a ferromagnetic material.

14. The extendable wing system of claim 11, wherein the actuator element is disposed on a pressure face of the associated wing.

15. The extendable wing system of claim 11, wherein the actuator element is disposed to generate a torsional deformation of the associated wing.

16. The extendable wing system of claim 11, further comprising a plurality of actuator elements distributed along at least a portion of one of the wings.

17. The extendable wing system of claim 11, wherein the actuator element is located at a discrete location along one of the wings.

18. The extendable wing system of claim 11, wherein the actuator element is disposed adjacent a trailing edge at the wing root of one of the wings.

19. The extendable wing system of claim 18, wherein the actuator element comprises a piezoelectric element.

20. The extendable wing system of claim 1, wherein the forward wing and the aft wing comprise composite pultrusions.

21. The extendable wing system of claim 1, wherein the forward wing and the aft wing comprise fiber-reinforced, resin matrix composites having at least a portion of fibers extending continuously in a longitudinal direction extending between the wing root and the wing tip.

22. The extendable wing system of claim 21, wherein a further portion of the fibers extends at an acute angle to the longitudinal direction.

23. The extendable wing system of claim 22, wherein the further portion of the fibers extends at generally ±45° to the longitudinal direction.

24. The extendable wing system of claim 21, further comprising a core within the portion of the fibers.

25. The extendable wing system of claim 24, wherein the core comprises fibers or a foam material.

26. The extendable wing system of claim 21, wherein the forward wing and the aft wing are hollow.

27. The extendable wing system of claim 1, wherein the forward wing and the aft wing are comprised of metal.

28. The extendable wing system of claim 1, wherein at least one of the forward wing and the aft wing has a spanwise twist distribution.

29. An air-born body comprising:
a fuselage;
a first extendable wing system and a second extendable wing system according to claim 1, the first and second extendable wing systems mounted to the fuselage to extend on opposite sides of the fuselage in the deployed position and to store against the fuselage in the stowed position.

30. The air-born body of claim 29, wherein a center of pressure of each of the first and second wing systems is disposed further aft than a center of gravity of the air-born body with the first and second wing systems in the deployed position.

31. The air-born body of claim 29, wherein a center of pressure of at least one of the first and second wing systems is disposed further aft than a center of gravity of the air-born body with the first and second wing systems in the deployed position.

32. The air-born body of claim 29, wherein a center of pressure of each of the first and second wing systems is disposed further forward than a center of gravity of the air-born body with the first and second wing systems in the deployed position.

33. The air-born body of claim 29, wherein a center of pressure of at least one of the first and second wing systems is disposed further forward than a center of gravity of the air-born body with the first and second wing systems in the deployed position.

34. The air-born body of claim 29, wherein the forward wing of the first wing system and the forward wing of the second wing system are coupled for simultaneously translation by the linkage system.

35. The air-born body of claim 29, wherein the aft wing of the first wing system and the aft wing of the second wing system are coupled for simultaneously translation by the linkage system.

36. The air-born body of claim 29, wherein the forward wing root of the first wing system and the forward wing root of the second wing system are coupled by the linkage mechanism for simultaneous motion.

37. The air-born body of claim 29, wherein the rear wing root of the first wing system end the rear wing root of the second wing system are coupled by the linkage mechanism for simultaneous motion.

38. The air-born body of claim 29, wherein the forward wing root of the first wing system and the forward wing root of the second wing system are coupled by the linkage mechanism for simultaneous motion; and
the rear wing root of the first wing system and the rear wing root of the second wing system are coupled by the linkage mechanism for simultaneous motion.

39. The air-born body of claim 29, wherein the forward wing root of the first wing system and the forward wing root of the second wing system are independently coupled to the linkage mechanism.

40. The air-born body of claim 29, wherein the rear wing root of the first wing system and the rear wing root of the second wing system are independently coupled to the linkage mechanism.

41. The air-born body of claim 29, wherein the forward wing root of the first wing system and the forward wing root of the second wing system are independently coupled to the linkage mechanism; and
the rear wing root of the first wing system and the rear wing root of the second wing system are independently coupled to the linkage mechanism.

* * * * *

UNITED STATES PATENT AND TRADEMARK OFFICE
CERTIFICATE OF CORRECTION

| | | |
|---|---|---|
| PATENT NO. | : 6,986,481 B2 | Page 1 of 1 |
| APPLICATION NO. | : 10/698580 | |
| DATED | : January 17, 2006 | |
| INVENTOR(S) | : Jerome P. Fanucci et al. | |

It is certified that error appears in the above-identified patent and that said Letters Patent is hereby corrected as shown below:

Column 10, line 22, "end the" should read --and the--;

Column 10, line 29, "end the" should read --and the--;

Column 10, line 55, "off claim" should read --of claim--;

Column 10, line 57, "off the" should read --of the--; and

Column 12, line 32, "end the" should read --and the--.

Signed and Sealed this

Eleventh Day of July, 2006

JON W. DUDAS
*Director of the United States Patent and Trademark Office*